(12) United States Patent
Yamagishi et al.

(10) Patent No.: US 12,270,502 B2
(45) Date of Patent: Apr. 8, 2025

(54) THERMAL INSULATOR AND METHOD FOR MANUFACTURING SAME

(71) Applicant: Panasonic Intellectual Property Management Co., Ltd., Osaka (JP)

(72) Inventors: Yuji Yamagishi, Hokkaido (JP); Ryosuke Usui, Hokkaido (JP); Yuuichi Abe, Hokkaido (JP); Shun Aota, Osaka (JP); Rikako Iwasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1174 days.

(21) Appl. No.: 16/960,012

(22) PCT Filed: Mar. 11, 2019

(86) PCT No.: PCT/JP2019/009557
§ 371 (c)(1),
(2) Date: Jul. 2, 2020

(87) PCT Pub. No.: WO2019/188159
PCT Pub. Date: Oct. 3, 2019

(65) Prior Publication Data
US 2021/0062955 A1 Mar. 4, 2021

(30) Foreign Application Priority Data
Mar. 30, 2018 (JP) ................. 2018-067346

(51) Int. Cl.
*F16L 59/02* (2006.01)
*C01B 33/16* (2006.01)
*D04H 1/413* (2012.01)

(52) U.S. Cl.
CPC .............. *F16L 59/02* (2013.01); *C01B 33/16* (2013.01); *D04H 1/413* (2013.01)

(58) Field of Classification Search
CPC .......... F16L 59/02; F16L 59/06; C01B 33/16; D01H 1/413; B32B 3/26; B32B 3/30;
(Continued)

(56) References Cited

U.S. PATENT DOCUMENTS 6,068,882 A * 5/2000 Ryu ....................... C04B 14/302
427/403
2011/0197987 A1 * 8/2011 Koravos ............... F16L 59/024
72/368

(Continued)

FOREIGN PATENT DOCUMENTS

JP 2011-136859 7/2011
WO WO-2013082290 A1 * 6/2013 ......... B29C 44/1228

OTHER PUBLICATIONS

International Search Report of PCT application No. PCT/JP2019/009557 dated May 28, 2019.

*Primary Examiner* — Jennifer A Gillett
(74) *Attorney, Agent, or Firm* — Rimon P.C.

(57) ABSTRACT

Provided is a thermal insulator which can be prevented from having gaps. The thermal insulator includes a nonwoven fabric, and xerogel in interior spaces of the nonwoven fabric. The thermal insulator has a plurality of protrusions on a surface of the thermal insulator, a height of the protrusion ranges from 0.10 $t$ to 0.25 $t$ inclusive and a size of the protrusion at the surface of the thermal insulator ranges from $t$ to 5 $t$ inclusive, where t is a thickness of the thermal insulator, and pores are provided inside the thermal insulator in a region provided with the protrusions.

3 Claims, 1 Drawing Sheet

(58) Field of Classification Search
CPC .......... B32B 2307/304; B32B 226/128; D04H 1/413; Y10T 428/24744; Y10T 428/24636; Y10T 428/24603; Y10T 428/24496; C08J 2205/028; C08J 5/06; C08J 5/08; C08G 2110/0091; C08G 2220/00
See application file for complete search history.

(56) References Cited

U.S. PATENT DOCUMENTS

| | | | | |
|---|---|---|---|---|
| 2013/0344279 | A1* | 12/2013 | Doshi | D04H 1/413 427/372.2 |
| 2014/0252263 | A1* | 9/2014 | Besselievre | E04B 1/80 264/234 |
| 2015/0366281 | A1* | 12/2015 | Miller | B32B 5/022 428/137 |
| 2016/0060808 | A1* | 3/2016 | Oikawa | D06M 10/10 427/342 |

* cited by examiner

THERMAL INSULATOR AND METHOD FOR MANUFACTURING SAME

FIELD OF THE INVENTION

The present disclosure relates to a thermal insulator to be used for thermal insulation, and a method for manufacturing the thermal insulator.

DESCRIPTION OF THE RELATED ART

In recent years, there has been a great demand for energy saving, and methods for achieving the energy saving include improvement of energy efficiency by heat-retention of equipment. To achieve the heat-retention, a thermal insulation sheet having an excellent thermal insulation effect is required. Thus, a thermal insulator may be used in which silica xerogel is carried on a nonwoven fabric to make the coefficient of thermal conductivity lower than that of air.

As prior art document information related to this technique, for example, Patent Literature 1 is known.

CITATION LIST

Patent Literature

PTL 1: Unexamined Japanese Patent Publication No. 2011-136859

SUMMARY OF THE INVENTION

However, the above-described thermal insulator is poor in flexibility, and the thermal insulator is compressed and is not restored when pressure is applied. Components that generate heat are easily expanded with an increase in temperature, and therefore have a problem that gaps are easily generated when the temperature decreases.

In order to solve the above-described problems, a thermal insulator of the present disclosure is a thermal insulator including a nonwoven fabric, and xerogel in interior spaces of the nonwoven fabric. The thermal insulator has a plurality of protrusions on a surface of the thermal insulator, a height of each of the plurality of protrusions ranges from 0.10 t to 0.25 t inclusive, and a size of each of the plurality of protrusions ranges from t to 5 t inclusive, where t is a thickness of the thermal insulator, and the thermal insulator includes pores under a region of the surface, the region being provided with the plurality of protrusions.

With the above configuration, the thermal insulator according to the present disclosure ensures that even when an external force is applied to the thermal insulator, pore portions are compressed, and when the force is eliminated, the thermal insulator is restored by a repulsive force, so that generation of gaps can be prevented.

DETAILED DESCRIPTION OF THE PREFERRED EMBODIMENTS

Hereinafter, a thermal insulation sheet according to an exemplary embodiment of the present disclosure will be described with reference to drawings.

Figure 1:
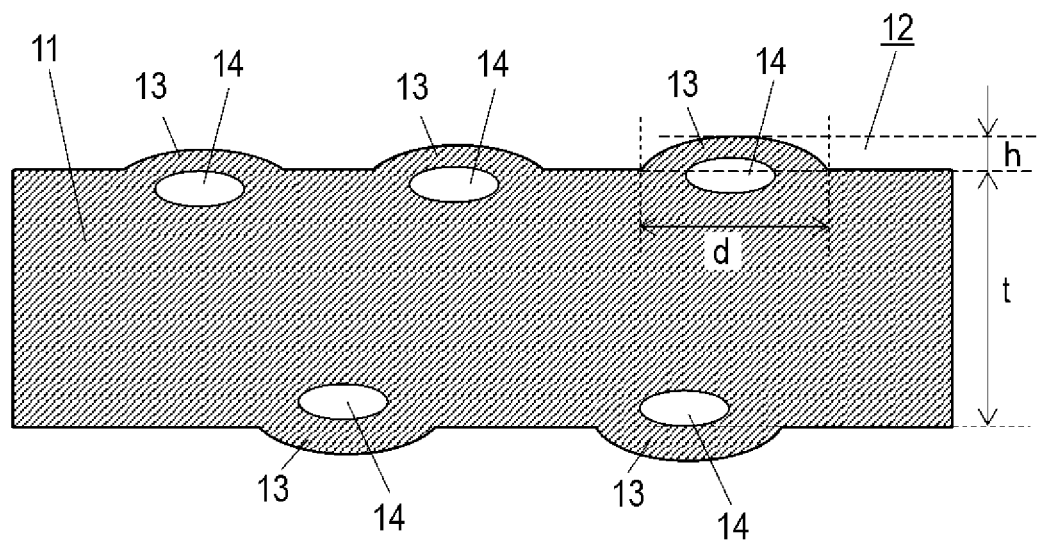
FIG. 1 is a sectional view of a thermal insulator according to an exemplary embodiment of the present disclosure.
Figure 2:
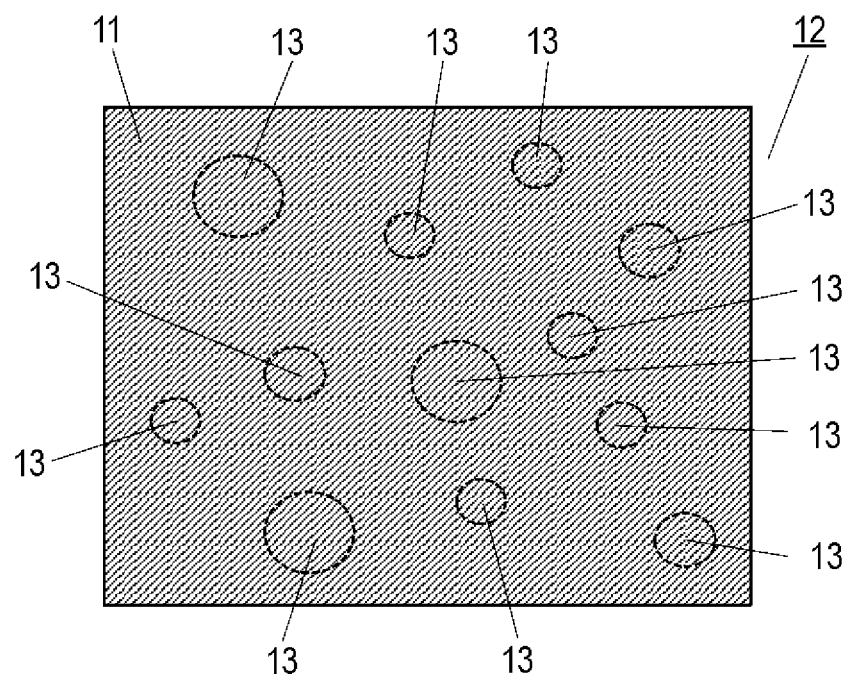
FIG. 2 is a top view of the thermal insulator according to the exemplary embodiment of the present disclosure.

FIG. 1 is a sectional view of a thermal insulator according to an exemplary embodiment of the present disclosure, and FIG. 2 is a top view of the thermal insulator according to the exemplary embodiment of the present disclosure.

Thermal insulator 12 is formed by carrying silica xerogel (not shown) in spaces of nonwoven fabric 11 made of glass fiber having spaces inside the glass fiber. Nonwoven fabric 11 includes short glass fiber having an average fiber thickness of about 10 μm and an average length of about 500 μm, and the spaces occupy about 90% of nonwoven fabric 11. Since this silica xerogel has nano-sized spaces inside the silica xerogel, a coefficient of thermal conductivity of a part filled with the silica xerogel is equal to or smaller than a coefficient of thermal conductivity of air. The silica xerogel is broad-sense xerogel with the gel being in a dried state, and may be obtained not only by ordinary drying but also by supercritical drying, freeze drying or the like.

Here, thermal insulator 12 has a thickness of about 1 mm and a size of about 100 mm square (about 100 mm□). A plurality of protrusions 13 made of a material identical to that of thermal insulator 12 are provided on a surface of thermal insulator 12, and protrusion 13 has height h of about 0.15 min from the surface of thermal insulator 12, and diameter d of about 3 mm at the surface of thermal insulator 12. Pores 14 are provided inside thermal insulator 12 in a region provided with protrusions 13.

This ensures that even when the surface provided with protrusions 13 is pressed, pores 14 generate a repulsive force, and the thermal insulator returns to an original shape the pressing force is removed. Thus, it is possible to obtain a thermal insulator in which gaps are hardly formed even when a force is applied to thermal insulator 12 due to elevation or falling of a temperature.

It is preferable that pores 14 are completely surrounded by silica xerogel and nonwoven fabric 11, and use of short fiber for the nonwoven fabric enables generation of a repulsive force even when the pores are not completely surrounded by the silica xerogel and the nonwoven fabric.

Preferably, the height of protrusion 13 ranges from 0.10 t to 0.25 t inclusive, where t is a thickness of thermal insulator 12. This is because when the height is less than 0.1 t, an effect of an invention according to the present disclosure is reduced, and when the height is more than 0.25 t, it is difficult to maintain a shape.

Preferably, diameter d of protrusion 13 at the surface of thermal insulator 12 ranges from t to 5 t inclusive. This is because when d is less than t, it is difficult to secure a sufficient height, and when d is more than 5 t, the repulsive force decreases.

Preferably, a ratio of protrusions 13 to a surface area of thermal insulator 12 ranges from 12.7% to 22.7% inclusive. When the ratio is less than 12.7%, an area receiving pressure may be excessively small, resulting in crushing of pores 14. Conversely, when the ratio is more than 22.7%, the repulsive force is reduced. For example, in this case, the surface area of the thermal insulator 12 is about 100 mm square, and hence about $10^4$ mm$^2$. For example, given that an average of areas of protrusions 13 is 7.1 mm$^2$ (diameter d is about 3 mm, d=3 t) and a number of protrusions is 200, a ratio of an area of protrusions 13 to an area of a surface of thermal insulator 12 is $7.1 \times 200/10^4 = 14.2\%$.

Further, it is preferable that, when a surface provided with protrusions 13 is on an upper side, pores 14 are provided at a position at 10% to 35% inclusive of thermal insulator 12 in a thickness direction. This is because when the position is closer to a center than the 35%-position, a sufficient repulsive force cannot be obtained, and when the position is closer to the surface than the 10%-position, strength of a surface portion is easily reduced.

In the exemplary embodiment, a shape of protrusion 13 on the surface of thermal insulator 12 is a circular shape, but is not limited to a circular shape, and may be an elliptic shape, or a shape in which a plurality of circles are partially connected, depending on a state of generation of bubbles. Here, for one protrusion having a certain shape, a size of protrusion 13 at the surface of thermal insulator 12 is defined as a diameter of a circle having an area equal to an area of protrusion 13. For example, given that protrusion 13 is a circle having diameter d, the size of protrusion 13 is defined as d.

Next, a method for manufacturing the thermal insulator according to the exemplary embodiment of the present disclosure will be described.

First, a nonwoven fabric made of short glass fiber having a thickness of about 1 mm and an average fiber length of about 500 μm is prepared.

Next, as step a), the nonwoven fabric is impregnated with a sol prepared by mixing 8% or more of a water glass raw material and a carbonic acid ester, and the sol is caused to turn into a gel. In a state of being sandwiched between films, the impregnated nonwoven fabric is subjected thickness regulation by use of a biaxial roll or the like to generate a hydrogel-nonwoven fabric composite. At this time, the hydrogel-nonwoven fabric composite is washed with water.

Next, as step b), the hydrogel-nonwoven fabric composite generated in step a) is mixed with a silylating agent to be silylated. For the silylation and the silylating agent, a known method and a known material can be used, and a method in which a hydrogel-nonwoven fabric composite is immersed in a hydrochloric acid aqueous solution, and then treated with a mixed solution of siloxane and alcohol is preferable because silylation treatment can be quickly performed.

Then, as step c), a liquid contained in the surface-modified hydrogel-nonwoven fabric composite obtained in step b) is removed by performing drying at a temperature below a critical temperature and at a pressure below a critical pressure to obtain a thermal insulation material with xerogel carried in interior spaces of the nonwoven fabric.

In step a), sodium carbonate may be produced along with dehydration condensation of silicic acid, and caught in the gel to obtain a strongly basic hydrogel. In step b), immersion of the hydrogel in hydrochloric acid causes a neutralization reaction between hydrochloric acid and sodium carbonate, so that carbon dioxide gas is rapidly generated.

When a short-fiber nonwoven fabric with less entanglement of fibers is used, many air bubbles are generated in a fiber sheet due to generation of carbon dioxide gas, it is possible to form pores inside the sheet, and form protrusions on a surface at positions of pores. Here, by carrying out the reaction with the hydrogel-nonwoven fabric composite disposed in a substantially horizontal direction, the generated gas is caused to move upward, and thus pores can be formed at positions above the center by lifting a surface portion on an upper side.

The short fiber nonwoven fabric as used herein refers to a nonwoven fabric having an average fiber length of 5 mm or less.

INDUSTRIAL APPLICABILITY

The thermal insulator and the method for manufacturing the thermal insulator according to the present disclosure ensure that even when an external force is applied to the thermal insulator, pore portions are compressed, and when the force is eliminated, the thermal insulator is restored by a repulsive force, so that generation of gaps can be prevented. Thus, the thermal insulator and the method for manufacturing the thermal insulator according to the present disclosure are industrially useful.

REFERENCE MARKS IN THE DRAWINGS

11 nonwoven fabric
12 thermal insulator
13 protrusion
14 pore

The invention claimed is:

1. A thermal insulator comprising a nonwoven fabric and silica xerogel in interior spaces of the nonwoven fabric, the silica xerogel including nano-sized spaces, wherein:
    the thermal insulator has a plurality of protrusions on a first surface of the thermal insulator,
    a height of each of the plurality of protrusions ranges from 0.10 t to 0.25 t, inclusive, and a size of each of the plurality of protrusions ranges from t to 5 t, inclusive, where t represents a thickness of the thermal insulator,
    the thermal insulator includes a plurality of pores, each of the plurality of pores is inside the thermal insulator under a region of the first surface, the region being provided with each of the plurality of protrusions,
    each of the plurality of pores is enclosed by the silica xerogel and the nonwoven fabric,
    each of the plurality of protrusions is caused by a deformation of the first surface due to one of the plurality of pores, and
    wherein the nonwoven fabric has an average fiber length of 5 mm or less.

2. The thermal insulator according to claim 1, wherein a percentage of an area provided with the plurality of protrusions in an entire area of the first surface of the thermal insulator ranges from 12.7% to 22.7%, inclusive.

3. The thermal insulator according to claim 1, wherein each of the plurality of pores is located in a range from 10% to 35%, inclusive, of the thickness of the thermal insulator measured from the first surface in a thickness direction.

* * * * *